Patented June 20, 1939

2,163,110

UNITED STATES PATENT OFFICE 2,163,110

SUBSTITUTED PERINAPHTHINDANDIONES

Fritz Straub and Peter Pieth, Basel, Switzerland, assignors to the firm of Society of Chemical Industry in Basle, Basel, Switzerland No Drawing. Application May 16, 1938, Serial No. 208,320. In Switzerland May 18, 1937

5 Claims. (Cl. 260—511)

The present invention relates to perinaphthindandiones having at least one salt-forming group as substituent in the naphthalene nucleus.

The expression "salt-forming groups" comprises such substituents which impart to the product the capacity of forming salts or salt-like compounds with acids or lyes, regardless of whether these salts or salt-like compounds are strongly or feebly hydrolytically decomposed by water. Salt-forming groups are therefore for example —$SO_3H$, —COOH, —SH, —OH, —$NH_2$, —$N(alkyl)_2$, —$SO_2NH_2$ and the like.

The new substituted perinaphthindandiones may contain one or several such salt-forming groups in various positions in the naphthalene nucleus, for example in ortho-, meta- or paraposition to one of the CO-groups standing in peri-position to each other. Those substituted perinaphthindandiones are however of particular importance which contain a salt-forming group in 5- (or 8-) position. (For the numbering of the substitution positions see Beilsteins Handbuch, 4th edition, Supplement, Vol. VII, page 391).

A valuable process for producing these new substituted perinaphthindandiones consists in heating the naphthalene-1:8-dicarboxylic acids substituted by salt-forming groups or the anhydrides thereof with malonic acid esters, for instance malonic acid diethyl-ester, at a high temperature, for example 150–250° C.; there may be added preferably zinc chloride as condensing agent. According to this process all naphthalene-1:8-dicarboxylic acid anhydrides substituted by salt-forming groups can be converted on principle into the corresponding perinaphthindandiones, particularly 3 - hydroxynaphthalene-1:8-dicarboxylic acid anhydride, naphthalene-1:8-dicarboxylic acid anhydride-3-sulfonic acid and 3-aminonaphthalene-1:8-dicarboxylic acid anhydride.

Aminoperinaphthindandiones may be made advantageously, besides by the process described above, by reducing nitroperinaphthindandiones in the usual manner, for example with alkali hydrosulfides, if desired in the presence of alkaline earth salts.

Further perinaphthindandiones substituted by salt-forming groups may in part also be produced in such a manner that amino- or sulfonic acid groups in amino- or sulfo-perinaphthindandiones are converted according to the known processes into other salt-forming groups or are replaced by such groups.

The perinaphthindandiones substituted by salt-forming groups are valuable intermediate products for the manufacture of dyestuffs and of pharmaceutical products.

The following examples illustrate the invention, the parts being by weight:

Example 1

150 parts of 3-hydroxynaphthalene-1:8-dicarboxylic acid anhydride, 160 parts of freshly fused finely pulverized zinc chloride and 300 parts of diethylmalonate are together heated for 5 hours at 175–185° C. After cooling the mass is ground with water, filtered and washed until no zinc ions can be detected in the washing water. The residue is dissolved with an addition of ammonia to produce a feebly alkaline solution in 1000 parts of water; this solution is filtered from undissolved constituents and the filtrate is acidified with hydrochloric acid. The 5-hydroxy-perinaphthindandione of the formula

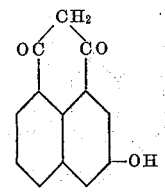

which has been precipitated is filtered, washed with water and dried. It is a bright yellow powder which melts with decomposition at about 260° C. It is insoluble in water but freely soluble in dilute sodium carbonate solution.

Example 2

100 parts of naphthalene-1:8-dicarboxylic acid anhydride-3-sulfonic acid, 200 parts of freshly fused and finely powdered zinc chloride and 400 parts of diethyl malonate are heated together while stirring well for 8 hours to 210–220° C. After cooling the mass is diluted with 1600 parts of water and heated to boiling, whereby the ethyl acetate formed is in larger part distilled; sodium carbonate is added until the reaction is distinctly alkaline and the whole is filtered from the precipitated zinc hydroxide. The filtrate is evaporated to ¼ of its volume in a vacuum and then acidified with hydrochloric acid. The crude sulfoperinaphthindione which is still impure from the presence of naphthalene-1:8-dicarboxylic acid anhydride-3-sulfonic acid is dissolved in water and salted out with the smallest possible quantity of common salt. It is then filtered and dried.

It is a brown powder freely soluble in water and dilute sodium carbonate solution, which in the form of the free acid has the formula

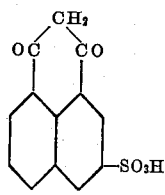

Example 3

262 parts of 5-nitroperinaphthindandione are suspended in 2000 parts of water and so much sodium carbonate is added as is necessary to dissolve 5-nitroperinaphthindandione. The solution is then heated to 60° C. and a mixture of 440 parts of crystallized sodium hydrosulfide in 950 parts of water and 580 parts of crystallized magnesium sulfate in 1000 parts of water is added, and the whole is stirred for 15 minutes at 60-70° C. By the end of this time the reduction is complete. 600 parts of common salt are added and after cooling to 15-20° C. the mixture is acidified slightly with hydrochloric acid of 15 per cent strength. The precipitate thus produced consists of crude 5-aminoperinaphthindandione and sulfur; it is filtered, suspended in 5000 parts of water and dissolved by addition of 106 parts of calcined sodium carbonate at 80-85° C. Filtration follows and the filtrate is acidified hot with 200 parts of concentrated hydrochloric acid. The 5-aminoperinaphthindandione is for the greater part in solution in the form of its hydrochloride. After filtration from undissolved constituents the filtrate is mixed with 10 per cent of its volume of common salt, filtered and the residue dried.

The 5-aminoperinaphthindandione of the formula

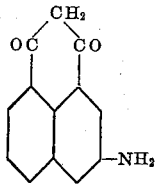

is thus obtained in the form of a red-brown powder which dissolves completely in water on addition of a few drops of hydrochloric acid. By neutralizing this solution with sodium carbonate the product is precipitated and may be redissolved in a solution alkaline with sodium carbonate.

What we claim is:

1. Substituted perinaphthindandiones which contain at least one salt-forming group as substituent in the naphthalene nucleus.

2. Substituted perinaphthindandiones of the general formula

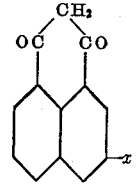

wherein $x$ stands for a salt-forming group.

3. The 5-hydroxyperinaphthindandione of the formula

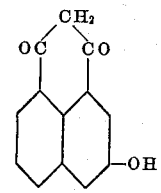

melting with decomposition at about 260° C., which product is insoluble in water and freely soluble in dilute sodium carbonate solution.

4. The perinaphthindandione-5-sulfonic acid of the formula

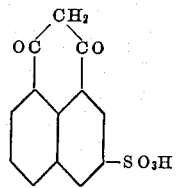

which is soluble in water and dilute sodium carbonate solution.

5. The 5-aminoperinaphthindandione of the formula

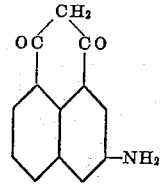

which is soluble in dilute mineral acids and in a solution alkaline with sodium carbonate.

FRITZ STRAUB.
PETER PIETH.